United States Patent Office 3,560,226
Patented Feb. 2, 1971

3,560,226
METHOD FOR PRODUCING FLAVORED OR COLORED CONFECTIONERY FOOD PRODUCTS
Maurie Laskin, Milwaukee, Wis., assignor to W. R. Grace & Co.
No Drawing. Filed June 6, 1967, Ser. No. 643,826
Int. Cl. A23g 3/00, 5/00; A21d 13/08
U.S. Cl. 99—130                                    7 Claims

ABSTRACT OF THE DISCLOSURE

Flavored and/or colored rehydratable, cellular, substantially dry freeze-dried confectionery food products are produced by adding a suitable amount of flavoring and/or coloring agent to the repressurizing gas stream which is used in bringing the freeze-drying chamber back to atmospheric pressure after the product has been dried to the desired moisture content at reduced subatmospheric pressures.

---

This application is related to prior copending, commonly assigned U.S. patent applications Ser. No. 465,835, filed June 18, 1965 and now U.S. Pat. 3,483,000; Ser. No. 464,832, filed June 17, 1965 and now U.S. Pat. 3,464,834; and Ser. No. 464,867, filed June 17, 1965 and now abandoned in favor of U.S. applications Ser. No. 619,584 filed Mar. 1, 1967 and now U.S. Pat. 3,396,041, Ser. No. 684,613, filed Nov. 21, 1967 and now U.S. Pat. 3,419,402 and Ser. No. 684,626 also filed Nov. 21, 1967 and now U.S. Pat. 3,472,633; which applications were, in turn, related to then copending application Ser. No. 324,240, filed Nov. 18, 1963 and now abandoned. This application is also related to recently filed U.S. application Ser. No. 619,584 entitled "Rehydratable, Freeze-Dried Peanut Butter Products" filed Mar. 1, 1967, and now U.S. Pat. 3,396,041 and Ser. No. 620,278 entitled "Chewy Confectionery Food Products and Method of Making" filed Mar. 3, 1967; especially the latter.

This invention relates to a method for flavoring and/or coloring freeze-dried confectionery food products. In particular the invention relates to a method for imparting desired flavor and/or color to a substantially dry, rehydratable, cellular, freeze-dried confectionery food product which has been dehydrated at greatly reduced pressures.

In the above-identified earlier related applications there are disclosed a wide variety of substantially dry, cellular, freeze-dried confectionery food products such as freeze-dried frozen ice milk confections (e.g., ice cream, ice milk, soft ices, high fat ices, sherbets, frozen custards and the like); gelatin and gelatin-base desserts, fresh coconut, cake, pie, starch-base pudding or pie fillings, peanut butter-containing products, and other like confectionery foods. A number of these earlier related applications also disclose and claim a process for preparing such products which comprises first solidly freezing the confectionery food at about atmospheric pressure to form a hard solid monolithic shape and then drying to a low moisture content by heating at reduced pressures of less than about 1.5 mm. of mercury (absolute) while controlling the rate of heating so as to prevent thawing and maintain the frozen portion of the product in the solid frozen state until dehydration is essentially complete.

It has now been found that desired flavor and/or color can be imparted to the the substantially dry products of these prior applications by adding to the repressurizing gas stream (used in bringing the freeze-drying chamber back to atmospheric pressure) a suitable amount of volatile flavoring and/or coloring treating agent. This method of flavoring and/or coloring is disclosed, but not claimed, per se, in recently filed related application Ser. No. 620,278 entitled "Chewy Confectionery Food Products and Method of Making" filed Mar. 3, 1967.

The method of this invention may be used for various purposes. Thus, for example, it may be used to flavor and/or color a bland, substantially dry, cellular freeze-dried confectionery food product prepared in accordance with the teachings of the earlier related applications. It may also be used to add additional flavor and/or color to a substantially dry, cellular, flavored and/or colored confectionery food product to further sharpen the flavor or taste or to replace portions of the original flavoring or coloring agent which may have been lost as a result of the drying at very low reduced pressures. The method of this invention may also be used for imparting a desired color for aesthetic or other reasons to a freeze-dried cellular confectionery food product which is flavored prior to drying and retains sufficient flavor in the dry state. Other like uses will also be apparent to those skilled in the art.

In the practice of the present invention a volatile treating agent is added, in suitable amounts, to the gas stream (typically nitrogen or air) which is fed into the freeze-drying apparatus when the evacuated drying chamber is brought back to atmospheric pressure upon completion of the desired drying cycle. The treating agent may be a flavoring agent, a coloring agent, a flavoring and coloring agent, or suitable mixtures of any of the foregoing. A wide variety of known flavoring and/or coloring agents or mixtures thereof may be used in the practice of the present invention. It is only necessary that the particular treating agent in question be capable of being carried in the vapor state or in the dispersed liquid or solid state under the prevailing conditions in the repressurizing gas stream. In the presently preferred embodiment of the present invention the treating agent is one which may be retained in the vapor state in the repressurizing gas stream. In those cases where the repressurizing gas stream also contains moisture, e.g., where the treating agent is in the form of an aqueous solution or suspension, it is important to control the consequent concurrent rehydration to a final moisture content of not more than about ten (10) percent by weight in order to retain satisfactory storage stability.

The treating agent may be added in any suitable predetermined amount up to the amount which can be retained in the flowing repressurizing gas stream. It will be understood that the maximum amount in any particular case will depend upon such factors as the temperature, velocity, total pressure, and constitution of the prepressurized gas stream. The flow of the repressurizing gas stream into the chamber is then continued until the desired degree of flavoring and/or coloring of the product is achieved. This will, in typical cases, involve a time period of from about 5 minutes or so up to several hours or more. In general, shorter treatment times will be needed as the thickness of the product being treated decreases. Cyclic increase and decrease of the chamber pressure may be used, where desired, to regulate flow.

The products resulting from the practice of the present invention are suitable for the same uses disclosed in the prior related applications, e.g., as center pieces in chocolate coated candy pieces and like items. They may also be coated with other edible coating materials which will protect them from atmospheric moisture; or they may be stored in sealed moisture-protective containers for later consumption, as such.

The invention will be further understood from the following illustrative specific examples.

EXAMPLE 1

Vanilla ice cream of 10 percent fat content was cut into monolithic slabs, ½ inch in thickness. The slabs were preliminarily cooled at atmospheric pressure to −5° Fahrenheit. The product was then placed in a freeze dryer chamber (Freeze Dry Pilot-Model UPFD–X, Vacudyne Corp.) and the pressure was reduced over a period of about 15 minutes (usually referred to as the "pull down" time) to 0.41 mm. of mercury (absolute). During this time the product temperature dropped to about −22° to −25° Fahrenheit due to evaporative cooling. The heat in the dryer platens was then applied according to the following schedule of chamber pressure, platen temperature and time for each sequence.

| Platen temperature (degrees Fahrenheit) | Pressure (millimeters of mercury, absolute) | Time |
| --- | --- | --- |
| 150 | 0.68 | 50 minutes. |
| 125 | 0.49 | 30 minutes. |
| 100 | 0.45–0.5 | 15 minutes. |

After a total drying time of 17 hours and 15 minutes according to the foregoing schedule, the freeze drying chamber was repressurized by passing a nitrogen gas stream through the chamber for about 1 hour. About 10 percent by weight of a commercially available, volatile, artificial chocolate flavoring agent was added to this gas stream. The product was then removed from the freeze drying chamber as monolithic slabs having a moisture content of about 1 percent by weight. As a result of the addition of the volatile chocolate flavoring agent to the repressurizing gas stream, the product had a noticeable pleasant-tasting chocolate flavor. This product was ideally suited for use as the centerpiece in a candy chocolate coated candy piece. An excellent end product with very good storage stability was obtained since the chocolate coating acts as a moisture vapor barrier surrounding the chocolate flavored center core.

EXAMPLE 2

A bland, unflavored gelatin dessert-type product of the sugar-free type was prepared in conventional manner by mixing 14 grams of dried gelatin with 0.473 liter of boiling water. After the gelatin was dissolved the mixture was poured into flat pans to a depth of about 12 millimeters, permitted to cool and placed in a refrigerated chamber. When gelation or setting was complete the trays were further chilled at atmospheric pressure to a temperature to about −23° Fahrenheit in order to solidly freeze the product. The trays were then placed into the freeze dryer chamber described in Example 1 and the pressure was reduced to about 0.45 millimeter of mercury (absolute) over a period of 10 minutes. During this time the temperature of the product dropped to about −30° Fahrenheit as a result of evaporative cooling. Thereafter the product was dried in accordance with the following schedule of chamber pressure and platen temperature.

| Platen temperature (degrees Fahrenheit) | Pressure (millimeters of mercury, absolute) | Time, minutes |
| --- | --- | --- |
| 235 | 0.33 | 15 |
| 240 | 0.34 | 20 |
| 237 | 0.32 | 55 |
| 190 | 0.33 | 130 |
| 155 | 0.35 | 190 |
| 122 | 0.30 | ¹ 1,000 |

¹ Overnight.

Upon completion of the drying cycle, the freeze dryer chamber was brought back to atmospheric pressure by introducing a nitrogen gas stream into the chamber. About 5 percent by weight of a volatile, artificial lime flavoring agent and about 5 percent by weight of a volatile green vegetable-base coloring agent in a suitable inert solvent were added to the nitrogen gas stream prior to its introduction into the freeze drying chamber. After the chamber had been brought back to atmospheric pressure it was held at this pressure under static conditions, i.e., without further inflow or outflow of the ambient nitrogen gas atmosphere, for one to two hours.

Upon removal of the product from the freeze drying chamber it was observed that it had an excellent and sharp characteristic lime flavor and a pleasing green color. The product was suitable for use as a candy centerpiece in like manner as the product of Example 1.

EXAMPLE 3

A fresh coconut was obtained and broken open. A portion of the coconut meat was cut into bite size chunks or pieces. These were frozen to a temperature of about 0 to plus 5° Fahrenheit at atmospheric pressure and then dried in the freeze drying apparatus described in Example 1. Pull down time was 7 minutes after which product temperature was about −10° Fahrenheit. The drying cycle was as follows:

Platen temperature
(degrees Fahrenheit):    Time
    150     3 hours 36 minutes.
    125     1 hour 50 minutes.
    150     1 hour.

Upon completion of the foregoing drying cycle, the freeze drying chamber was brought back to atmospheric pressure by introducing a flowing stream of air. A volatile artificial chocolate flavoring agent was added to this flowing gas stream and the chamber was held under static conditions at atmospheric pressure for one to two hours in a manner similar to that described in Example 2. The product recovered was excellently suited for use as the centerpiece in chocolate coated candy and had, before coating, a pleasant characteristic chocolate flavor. A volatile imitation coconut flavor could be added to the gas stream in the same manner, either alone or together with the chocolate or other flavoring agent, to enhance coconut taste.

EXAMPLE 4

A substantially dry cellular peanut butter-containing product was prepared from the following ingredients in the approximate amounts indicated:

| | Parts by weight | Weight percent |
| --- | --- | --- |
| Gelatin (200 Bloom) | 4.3 | 0.6 |
| Cold water | 17.0 | 2.5 |
| Vegetable base emulsifier (Durkee's Betrkreme) | 45.4 | 6.7 |
| Water | 105.0 | 15.5 |
| Granulated sugar | 119.2 | 17.6 |
| 43° glucose (Dextrose equivalent (D.E.) of 42) | 45.4 | 6.7 |
| Salt | 1.4 | 0.2 |
| Peanut butter* | 340.0 | 50.2 |
| Total | | 100.0 |

* Commercially available "Old Time Old Fashioned" peanut butter distributed by Randy's Inc., and made from selected peanuts and salt.

The gelatin was stirred into the cold water in a suitable container and slowly warmed to about 150° Fahrenheit to get complete dissolution.

The emulsifier, sugar, glucose, salt and remaining water were weighed into a separate container and brought to a boil while stirring. The solution was then poured into a household type mixing bowl and beat for four minutes at speed 1, five minutes at speed 6 and four minutes at speed 10. The mixer speed was then slowed to speed 4 and the gelatin solution was added while mixing continued. When all of the gelatin solution had been added the mixing speed was raised again to speed 10 for two more minutes.

The peanut butter was then added to the resultant highly aerated foamy mass and folded in until a uniform admixture was obtained. This gave a peanut butter-containing product having about an 85 percent "overrun," i.e., a volume of about 185 percent of the volume of the peanut butter added.

The admixture was divided into bite-size chunks and quickly frozen at atmospheric pressure to a temperature where it was sufficiently solid to hold the overrun obtained. A temperature of about 0° Fahrenheit is usually sufficient. Preferably, however, the product is quickly frozen to —50° Fahrenheit or below by liquid nitrogen freezing.

The solidly frozen admixture can then be freeze dried in the manner described in the preceding examples. For example, shaped pieces of the solidly frozen admixture have been dried according to the following schedule, using the equipment described in Example 1:

|  | Time, minutes |
|---|---|
| Pull down time | 5 |
| Platen temperature (° Fahrenheit): |  |
| 100 | 50 |
| 125 | 70 |
| 150 | 50 |
| 125 | 75 |
| Heaters off (temperature drops to 90°) | 15 |
| Product removed | 265 |

The substantially dry pieces were flavored with an artificial peanut butter enhancer flavoring agent in the manner described in Example 1. The resulting lightweight, highly cellular peanut butter-containing product had excellent body, texture and flavor and was eminently suited for use, e.g., as a candy centerpiece in chocolate coated candy or cookies.

It will be understood that the invention may be applied to other products than those specifically shown in the illustrative examples and to the use of other flavoring and/or coloring agents than those specifically exemplified. It is intended that the scope of the invention is to be limited only as indicated by the appended claims.

What is claimed is:
1. In the method of preparing rehydratable, cellular, substantially dry confectionery food products by first solidly freezing at about atmospheric pressure to form a hard solidly frozen monolith, followed by freeze drying to a low moisture content by heating at reduced pressures of less than about 1.5 millimeters of mercury while controlling the rate of heating so as to prevent thawing and maintain the frozen portion of the product in the solid frozen state until dehydration is essentially complete; the improvement which comprises imparting desired flavor and/or color to the said dry product by adding to the repressurizing gas stream used in bringing the freeze drying chamber back to atmospheric pressure a suitable amount of treating agent selected from the group consisting of flavoring agent, coloring agent, flavoring and coloring agent and mixtures thereof; and controlling rehydration to a final moisture content of not more than about ten percent by weight.

2. Method of claim 1 in which said confectionery food product is selected from the group consisting of frozen ice milk confections, gelatin and gelatin-base desserts, fresh coconut, cake, pie, starch-base puddings and pie fillings, and peanut butter-containing products.

3. Method of claim 2 wherein said confectionery food product is ice cream.

4. Method of claim 2 wherein said confectionery food product is gelatin dessert.

5. Method of claim 1 wherein said treating agent is in the vapor state under the conditions prevailing in said repressurizing gas stream.

6. Method of claim 5 wherein said vapor treating agent is artificial fruit flavor.

7. Method of claim 5 wherein said vapor treating agent is artificial chocolate flavor.

References Cited
UNITED STATES PATENTS

| 1,251,359 | 12/1917 | Etaix | 99—71 |
| 2,166,074 | 7/1939 | Reichel | 99—71UX |
| 2,563,233 | 8/1951 | Gilmont | 99—71 |
| 3,368,905 | 2/1968 | Rollins | 99—204 |

OTHER REFERENCES

Colson et al.: Freeze-Drying of Foodstuffs, Columbine Press, Manchester and London, 1963, p. 28.

RAYMOND N. JONES, Primary Examiner

J. M. HUNTER, Assistant Examiner

U.S. Cl. X.R.

99—92, 125, 128, 136, 139, 140, 199